United States Patent [19]

Lomax, Jr. et al.

[11] 4,085,173

[45] Apr. 18, 1978

[54] MANUFACTURE OF SOLID PROPELLANT

[75] Inventors: George F. Lomax, Jr., McGregor; Arthur A. Coleman, Waco, both of Tex.

[73] Assignee: Hercules Incorporated, Wilmington, Del.

[21] Appl. No.: 402,067

[22] Filed: Oct. 5, 1964

[51] Int. Cl.² ............................................. C06B 21/00
[52] U.S. Cl. ...................................... 264/3 R; 86/1 R; 86/20 D; 102/102
[58] Field of Search .............. 102/98, 39; 60/35.6 RS; 86/1, 20; 264/3, 108; 18/45

[56] References Cited

U.S. PATENT DOCUMENTS

| | | | |
|---|---|---|---|
| 2,995,091 | 8/1961 | Haynes et al. | 102/98 |
| 3,022,735 | 2/1962 | Eberle | 102/98 |
| 3,090,196 | 5/1963 | Brewer | 60/35.6 |
| 3,108,433 | 10/1963 | De Fries et al. | 60/35.6 |
| 3,140,663 | 7/1964 | Reimbel et al. | 102/98 |

Primary Examiner—Verlin R. Pendegrass
Attorney, Agent, or Firm—Michael B. Keehan

EXEMPLARY CLAIM

1. A method manufacturing solid propellant grains comprising:
   providing an elongated center core,
   disposing metal filaments radially extending therefrom,
   inserting said core and filaments in a porous cylinder having a diameter less than that of said core and filaments, whereby said filaments protrude through said cylinder,
   bonding said protruding ends of said filaments to said porous cylinder,
   casting a solid propellant matrix between said porous cylinder and said core
   and curing said propellant matrix.

4 Claims, 14 Drawing Figures

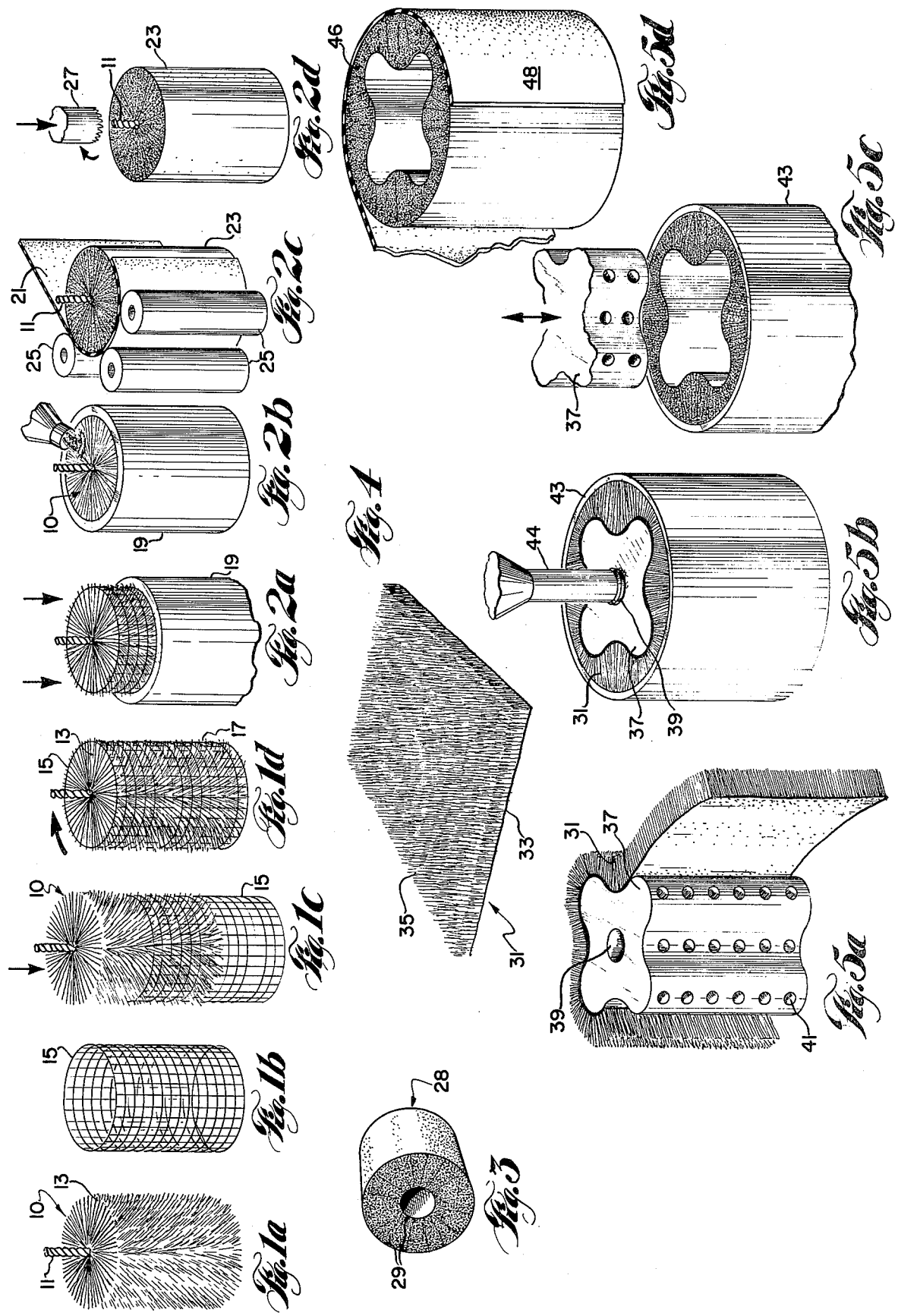

MANUFACTURE OF SOLID PROPELLANT

This invention relates to solid propellant grains and methods of manufacture. More particularly, the invention relates to solid propellant grains and the method of manufacture wherein high radial burning rates are provided.

In co-pending application, Ser. No. 144,265, filed Oct. 10, 1961, and now U.S. Pat. No. 3,811,358 the solid propellant grain is disclosed having circumferentially wound filaments or wires disposed within the propellant matrix. The disposition of such filaments provided for solid propellants having significantly greater structural strength characteristics over non-reinforced solid propellants. This reinforced propellant grain enabled higher solids loading and thus could effectively increase the impulse of a motor over non-reinforced grain. The referred to circumferentially reinforced propellant grain has unusual burning characteristics due to the fact that burning occurs along the circumferentially wound wires themselves as well as in a direction perpendicular to the inner core which does not follow the wires but rather is burned according to the matrix as in an ordinary propellant. In order to increase the circumferential burning characteristic, a concept was evolved for slotting the reinforced grain as disclosed in co-pending application, Ser. No. 240,205, filed Nov. 23, 1962 and now U.S. Pat. No. 3,822,645.

Fast radial burning is particularly desirable in several applications for solid propellants where a large mass flow rate of propellant is desired in a short period of time. Applications for fast radial burning solid propellant is found in igniters, retro-motors and seat ejection units, all of which require a high thrust and extremely short duration of burning. Present methods for producing high burning rates in a radial direction, in addition to the slotting method previously referred to, is the utilization of the addition of metallic additives in the form of random dispersed flakes, wires, free-forms and the like. These random oriented metallic additives offer little control in ballistic reproducibility when radial burning is desired. Additionally, they provide very little structural strength which is needed often due to the high g-load on the fast burning motor. Additionally, the previous forms of metallic additives do not enable high solids loading of the propellant.

Thus an object of this invention is to provide a method of manufacture and the resulting solid propellant grain which possesses a high radial burning rate.

Another object of this invention is to provide a method of manufacture for and resultant solid propellant grain and a radial reinforcing structure to provide high strength properties when subjected to high energy loads.

Still another object of this invention is to provide a method of manufacture and a resultant solid propellant grain which will have ballistic reproducibility in a radial burning direction.

One other object of this invention is to provide a method of manufacture and a resultant solid propellant grain wherein close control of the amount of reinforced material can be obtained.

Still one further object of this invention is to provide a method of manufacture and a resultant solid propellant grain which will have both reinforcing material and a high solids loading.

The above and other objects of this invention are accomplished by utilizing metal filaments in a brush-like structure. In one embodiment, for example, the metal reinforcing fuel filaments radially extend from a center core in a manner similar to a bottle brush having the appearance of individual bristles. In this configuration, the brush has a cylindrical configuration. The brush after being constructed of a predetermined concentration of filaments of predetermined diameter and constituency is inserted into an outer sleeve which may be comprised of a metal screen, for example, such that the outer radial tips of the bristles extend through the pores in the screen. The next step of the process of manufacture of the solid propellant grain is to bind the outer tips which protrude from the sleeve to the sleeve member which can be accomplished by applying adhesive material thereto. This rigidly affixes the position of the bristles, preventing movement thereof within the sleeve member. Next the propellant matrix material to be utilized is poured into the area bounded by the core of the brush and the outer screen, infiltrating the bristles. The resultant item which will be normally cured is a solid propellant matrix for grain having metal wires radially extending from the center thereof. After curing, the center core, from which the wires extend may be cut and removed from the grain thus leaving an internal burning grain with a central cylindrical hole in a normal manner. The final product is then utilized in a conventional manner the same as any other solid propellant grains and they have a liner bonded about its outer circumference and then can be placed in a suitable casing. Alternatively to the cylindrical brush configuration for the solid propellant grains of this invention, the starting material may take the form of a flat mat or screen having a plurality of metal fibers or bristles extending perpendicular thereto, having the general appearance of a floor mat, for example, with a plurality of bristles. This configuration will lend itself particularly to grains having unusual internal core designs. Utilizing the flat mat with the perpendicular bristles, the mat is placed about an internal core and bonded thereto such that the bristles extend radially from the core. The core with radially extending bristles may then be inserted in an outer cylindrical screen, or in the manner previously described, and bonded thereto or may be placed directly in a solid cylinder with no bonding transpiring since the bristles are normally more rigidly attached and positioned in this type of configuration. The bristles are then infiltrated with matrix in the same manner previously described, cured, and the inner core removed. The resultant product will have reinforcing metal filaments essentially radially extending from an inner core to provide the desired results of this invention. The invention will be better understood from the following details, description and drawings in which:

FIGS. 1a–1d is a pictorial representation of the initial steps inserting a metal radial bristle structure in an outer screened case.

FIGS. 2a–2d represent the further steps in the process of the manufacture of a solid propellant grain of this invention through the final cure and removal of the center core.

FIG. 3 represents the final product made in accordance with the steps shown in FIGS. 1 and 1a through 1d and 2a–2d.

FIG. 4 is a pictorial representation of the embodiment of this invention showing a mat with perpendicularly disposed bristles.

FIGS. 5a through 5d are pictorial representations of the steps in forming a grain utilizing the mat and bristles shown in FIG. 4.

Referring now to FIG. 1a, there is shown a bristle type structure which is for example constructed of aluminum. The center piece 11 is of wound heavy gauged aluminum wire while the thin fibers 13 extend radially therefrom in the manner similar to all brush like structures. The metal wires may vary from 0.003 inch up to thin wall tubes of an inch or larger in diameter depending on the given application. FIG. 1b discloses an outer screen housing or cage 15, in assemblying the brush 10, as shown in FIG. 1c, the wire screen housing 15. As can be seen in FIG. 1d particularly, the screen housing is of slightly less diameter than the brush 10, such that the ends 17 of the wire bristles 13 extend and protrude outwardly from the screen 15. At this point in the process, an adhesive material, not shown, is then applied by a brush or other means above the outer circumference of the housing 17, coating the protruding wires and the screen. Any type of commercial adhesive generally is suitable, for example, an epoxy adhesive can be utilized. The adhesive material is then cured according to its given procedure and then a torque motion is applied to the brush 10 as indicated by the arrow in 1d. This torque motion puts a tension on the fibers 13 which are now secured at their end points 17 to the screen housing 15. The tension enables the wires to be maintained taut when the propellant is subsequently poured into and among the bristles.

With reference now to 2a, upon completion of the application of torque to the brush within the wire container, the assembly is placed in a casting fixture 19 which essentially has a diameter equal to that of the brush so that a relatively tight fit is secured. The solid propellant is then cast into the fixture 19 containing the brush 10 as shown in FIG. 2b by conventional casting techniques. If the propellant is not particularly viscous, it will normally flow into the container without further steps. Alternatively, a vacuum may be placed upon the container as is often done in conventional casting so as to prevent the formation of any voids within the propellant and draw the matrix into a tight compact mass. Alternatively, in the case of double based propellants, the material may be extruded into the casting container 19. It is pointed out that any conventional casting techniques can be utilized to fill the container 19, having the brush 10 therein. After casting in accord with that shown in FIG. 2b, the material can then be cured to a solid cohesive state. The periphery of the grain may be trimmed (not shown) to eliminate the outer screen if desired, or the screen may be left in place, depending on the given application. Normally, if the screen is adjacent an insulating material, it cannot affect the performance of the grain. As shown in FIG. 2c, an insulating material 21 may be rolled about the final grain 23 by rollers 25 when such is desired. It is noted that any conventional technique in utilizing cured solid propellant grains may be utilized after the completion of the cure of the grain. FIG. 2c showing the application of insulating material is but one of several conventional techniques. Finally, as disclosed in FIG. 2d, the center core containing the heavy wire 11 is normally removed by a hole cutter 27. As indicated in FIG. 3, a completed grain 28 will have a web 29 governed by the size of the hole cut by the cutter 27 and of course the outer diameter of the wire or wide brush initially used.

Turning now to another embodiment of the invention, there is disclosed in FIG. 4, a structure 31 comprised of a backing or mat material 33 having a plurality of wires 35 extending essentially perpendicular thereto. The wire 35 can be woven into the backing or matting 33 which could be a screen material or could be adhered thereto by any adhesive such as the type as is used to secure the radial fibers of the brush to the outer cylindrical screen as previously described. The advantage of this type of mat of structure 31 resides in its flexibility and ease of utilization for unusual configurations and shapes. FIGS. 5a–5d, particularly illustrate such utilization. With reference to FIG. 5a, the mat structure 31 is shown being wrapped around a mandrel 37 having a center hollow core 39 running longitudinally therethrough with a plurality of apertures 41 communicating therewith and extending to the outer periphery of the mandrel. As can be seen, the mandrel has a peculiar configuration similar to a four-leaf clover, for example, and the mat material 31 can, because of its flexibility, be easily wrapped around the mandrel, conforming to its configuration. The mandrel and mat can then be inserted into a casting cylinder 43 as shown in FIG. 5b. The propellant can then be cast through tube 44 into the center core 39 of the mandrel 37. The propellant will then flow out through the apertures 41 and fill the interstices between the individual wires 31. Alternatively, the propellant can be conventionally cast. As shown in FIG. 5c, upon the completion of the cure of the material, the mandrel 37 can be removed and the grain would be ready for utilization. In FIG. 5d, the final propellant 46 can be wrapped with a conventional insulating material 48 for insertion into a motor case.

The advantages of the invention reside, in addition to fast radial burning, in the great flexibility and ease of manufacture. As should be apparent, a wide variety of wires may be utilized. The size of the wires can vary from 0.003 in. diameter wires up to hollow, thin walled tubes which could be filled with highly reactive materials. Additionally, the particular configuration of the brush type structure could be varied from that shown in the figures. For example, the individual wires could extend from a hollow cylinder rather than a wound heavy wire as shown. The main feature is to provide a structure wherein the wires, in fact, radially extend from a central structure. The amount of the wires can vary as desired in accord with the design of the particular motor. One should take into account the size of wire, the amount and kind of metal desired to be present in the final motor, and other criteria in determining the wire structure to be utilized.

The metals constituting the filaments, the propellant binders, oxidizers, additives and the like that are contemplated are all disclosed in the referred to co-pending application, Ser. No. 144,265. Compositions containing 10–20 percent metal in the form of filaments or filament and dispersed powder, 60–70 percent oxidizer and 1 to 30 percent binder are are contemplated. Following is a specific example of a propellant made in accord with this invention.

EXAMPLE I

A six inch solid propellant grain was made according to the invention. The wire brush reinforcing element was six inches in diameter and comprised of 7½mil, 5,056 aluminum alloy bristles radially extending from a one-sixteenth inch soft aluminum center stem. The brush was 11 inches in length and contained approximately 1,350 bristles radially extending from the center stem. The aluminum wire brush was inserted in a cylindrical 20 mesh aluminum screen having a diameter of 5.9 inches, with length of 11 inches. Thus, upon insertion of the brush into the cylindrical screen, a very slight protusion of the bristles through the apertures in the screen was present. The outer circumference of the screen cylinder containing the brush was coated with adhesive material which was Epon 828 made by the Shell Chemical Company. This is a normally liquid epoxy resin which is a condensation product of epichlorohydrin and bisphenol-A. Upon curing of the epoxy adhesive, the bristles were then rigidly bonded to the cylindrical wire screen. A slight torque was applied to the center stem of the bristles to rigidly position the wires. The wire screen cylinder containing the bristles was then inserted into a metal casting container which snugly fit the cylinder. The propellant matrix utilized contained 14 weight percent carboxy terminated linear polybutadiene as the binder material, 70 percent solid particulate ammonium perchlorate as the oxidizer and 14 weight percent aluminum powder with a final 2 weight percent aluminum contributed by the bristles.

The mixed propellant was heated to 170° F so that it was readily pourable into the casting container containing the brush element and cylindrical wire screen. After filling with the propellant, casting container was then vibrated to rid the propellant of any voids as is normally done in propellant casting operations. Next the container with propellant therein was placed in an oven heated to 170° F and was cured for 156 hours to a solid cohesive mass. The propellant and container was then removed from the oven and allowed to cool. The propellant having the wires disposed therein was removed from the casting container and a 5 inch diameter hole as cut at the center of the formed grain with a conventional type hole cutter. This left the propellant having a one-half inch web which is standard for test purposes in a conventional six inch Rohm and Haas test motor.

After the hole was cut in the grain, the grain was then coated with a restrictor material which was comprised of 87.728 percent carboxy terminated linear polybutadiene, 8.77 weight percent acetylene black and 3.51 percent of MAPO which is tris[1-(2-methyl)-aziridinyl]-phospine oxide. The coated propellant was then placed in a conventional six inch Rohm and Haas test motor for firing.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A method manufacturing solid propellant grains comprising:
    providing an elongated center core,
    disposing metal filaments radially extending therefrom,
    inserting said core and filaments in a porous cylinder having a diameter less than that of said core and filaments, whereby said filaments protrude through said cylinder,
    bonding said protruding ends of said filaments to said porous cylinder,
    casting a solid propellant matrix between said porous cylinder and said core
    and curing said propellant matrix.

2. The method of claim 1 additionally comprising removing said core from said cured propellant.

3. The method of claim 1 additionally comprising removing said porous cylinder from said cured propellant.

4. The method of claim 1 additionally comprising rotating
    said porous cylinder relative to said core whereby torque is applied to said bonded filaments.

* * * * *